Figure 1:
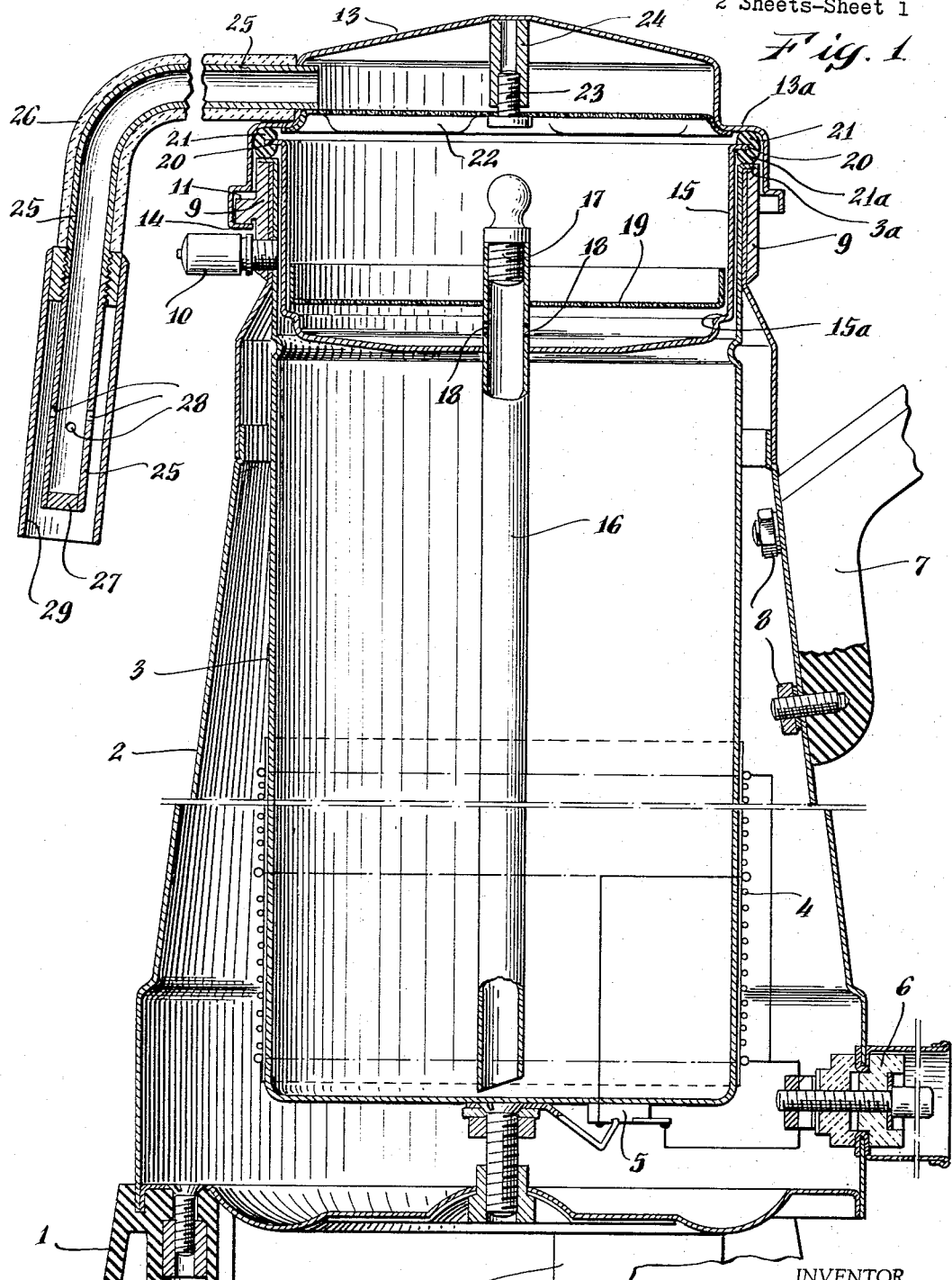

Oct. 3, 1967   L. VON KLEYDORFF ET AL   3,344,732
ELECTRIC COFFEE MAKER
Filed Feb. 18, 1965   2 Sheets-Sheet 1

INVENTOR.
Ludwig von Kleydorff
BY Joseph Perucco
John W. Hoag
ATTORNEY.

Oct. 3, 1967    L. VON KLEYDORFF ET AL    3,344,732
ELECTRIC COFFEE MAKER
Filed Feb. 18, 1965    2 Sheets-Sheet 2
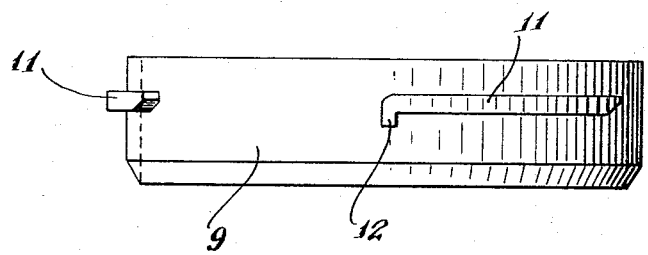
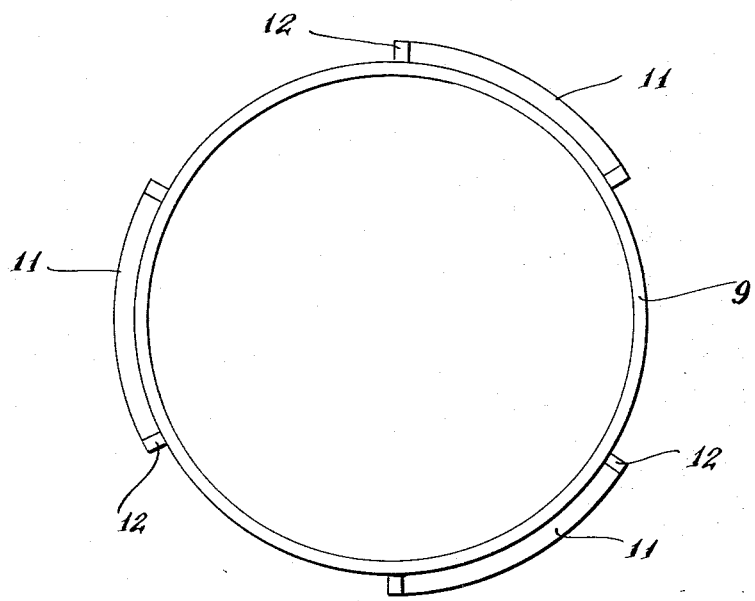
INVENTOR.
Ludwig von Kleydorff
Joseph Perucco
BY
John W. Hoey
ATTORNEY.

3,344,732
ELECTRIC COFFEE MAKER
Ludwig von Kleydorff, Wilton, Conn., and Joseph Perucco, Rorschach, Saint Gally, Switzerland, assignors to Zappia-Paradiso, S.A., Lugano, Switzerland, a corporation of Switzerland
Filed Feb. 18, 1965, Ser. No. 435,408
Claims priority, application Switzerland, Apr. 2, 1964, 4,168/64
1 Claim. (Cl. 99—292)

This invention relates to an improvement in electric coffee makers.

An object of the invention is to provide such a device with simple dependable means for securing a cover to a water container.

Another object of the invention is to provide a permanently good seal between the cover and the container.

A further object of the invention is to provide means whereby the coffee can be poured without splattering where there is rapid evaporation of water in the container.

The invention will be best understood by reading the following description in connection with the drawings in which:

FIGURE 1 is a side elevational view largely in section.
FIGURE 2 is a plan view of ring 9 which surrounds the neck of the container, and
FIGURE 3 is a side view of ring 9 showing the rings 11 thereon.

In the embodiment of the invention illustrated in the drawings a water container 3, which can be heated by a heating coil 4 is inserted into the housing 2 which is supported on three feet 1.

The heating coil 4 is connected in circuit with a thermostat 5 and socket 6 which is fastened in the housing 2. A handle 7 is attached by screws 8 to the housing 2. The neck of the housing 2 and of the water container 3 is surrounded by a metal ring 9 in which a safety valve 10 is arranged.

The metal ring 9 has on its periphery three ribs 11 which extend over about 60° of its periphery in a circumferential direction and are about 60° apart from each other, as can be noted from FIGURE 2. Each rib 11 has at one end a downward bent part 12 serving as stop.

The cover 13 has channel shaped rim portions 14 which extend over about 60° of the periphery of the cover in a circumferential direction and are about 60° apart from each other. When the cover 13 is placed on the neck of the container the rim portions 14 are introduced between the ribs 11, and when the cover is turned portions 14 extend over, and engage below, the ribs 11, as shown on the left-hand side of FIGURE 1. The turning of the cover is limited by the stops 12.

Into the neck of the container 3, there can be inserted a cup-like member 15 through the bottom wall of which passes a riser tube 16 which extends down to near the bottom of the container 3. Tube 16 is closed on top by a pin 17, and has holes 18 which are located above the bottom of member 15 and below a bottom filter or strainer 19 which rests on the inwardly extending flange 15a of member 15. Ground coffee can be poured onto member 19. The upper edge 20 of the member 15 is bent outward and engages in a notch 21a on the inside face of a rubber ring 21 which is disposed in the space between the skirt portion of cover 13 and the upper edge of the neck of the container which is bent outwardly providing a circular flange 3a on which ring 21 rests.

On the inner side of the cover 13 there is provided a filter disc 22 which is pressed against the cover 13 by a screw 23 which is screwed into an internally threaded stud 24 depending from the cover.

An outlet tube 25 fastened to the cover 13, communicates with space within the cover above filter disc 22. Tube 25 is surrounded by a heat-insulating outer tube 26, and is closed at its outer end by a plug 27. In the tube 25 there are outlet openings 28 which are directed obliquely rearward from the inside to the outside. Around the holes 28, there is provided an outer tube 29 of larger diameter which serves to discharge the coffee emerging through the holes 28. The guiding of the coffee through the holes 28 into the space between the tubes 25 and 29 is for the purpose of avoiding the splattering out of the coffee in case of rapid evaporation of the water in the container 2. The outlet tube forms a pressure nozzle in the manner described.

The ribs 11 on the metal ring 9 and the rim portions 14 of the cover 13, as well as the rubber ring 21, are so dimensioned that when the cover 13 is placed on the neck of the container and turned, causing the cover rim parts 14 to grip around the ribs 11 on the ring 9 surrounding the neck of container 3, the rubber ring 21 lies loosely between the flange 3a at the upper edge of the neck of the container and the cover, and is not compressed. This makes possible an easy placing on and turning of the cover since there is no friction between the rubber ring and adjacent parts. Furthermore, in this way the rubber ring is not subjected to wear. When in operation steam forms in the container 3 and the container becomes heated, the parts expand and the rubber ring 21 is pressed firmly, by the internal pressure exerted in its incision 21a, downward against the upper edge or flange 3a of the neck of the container, and upward and outward against the outwardly stepped flange or skirt portion 13a of the cover, thus producing a dependable seal.

There has thus been provided a device in which the above stated objects are accomplished in a simple and practical way.

What we claim is:

A pressure coffee maker comprising an open top liquid container having means for heating water therein, and having an outwardly extending flange at the top, and a cover which has an outwardly and downwardly extending skirt portion adapted to extend over and around the top of the container when the cover and container are assembled, and coacting means carried by the container and cover respectively for locking the cover on the container when the cover is placed over the top of the container and rotated relative to the container, the said coacting means serving also to space the skirt of the cover above the said flange of the container, a cup-like member supported within the upper portion of the container and having an outwardly extending peripheral edge portion, and a sealing ring disposed on the container flange in the space between the said flange and the skirt of the cover, the said skirt portion of the cover being so dimensioned relative to the top of the container and to the sealing ring that when the cover and container are interlocked the sealing ring is supported on the edge of the cup-like member in an uncompressed condition within a space between the top of the container and the skirt portion of the cover, the sealing ring having on its inner face an incision, the rim portion of the cup-like member being engaged within said incision, said sealing means being responsive to heat and steam within the coffee maker to expand outwardly against the top of the container and against the inside of the skirt portion of the cover.

References Cited

FOREIGN PATENTS

| 1,278,224 | 10/1961 | France. |
| 248,119 | 6/1912 | Germany. |
| 630,776 | 10/1949 | Great Britain. |
| 679,509 | 9/1952 | Great Britain. |

WALTER A. SCHEEL, *Primary Examiner.*

S. P. FISHER, *Assistant Examiner.*